UNITED STATES PATENT OFFICE.

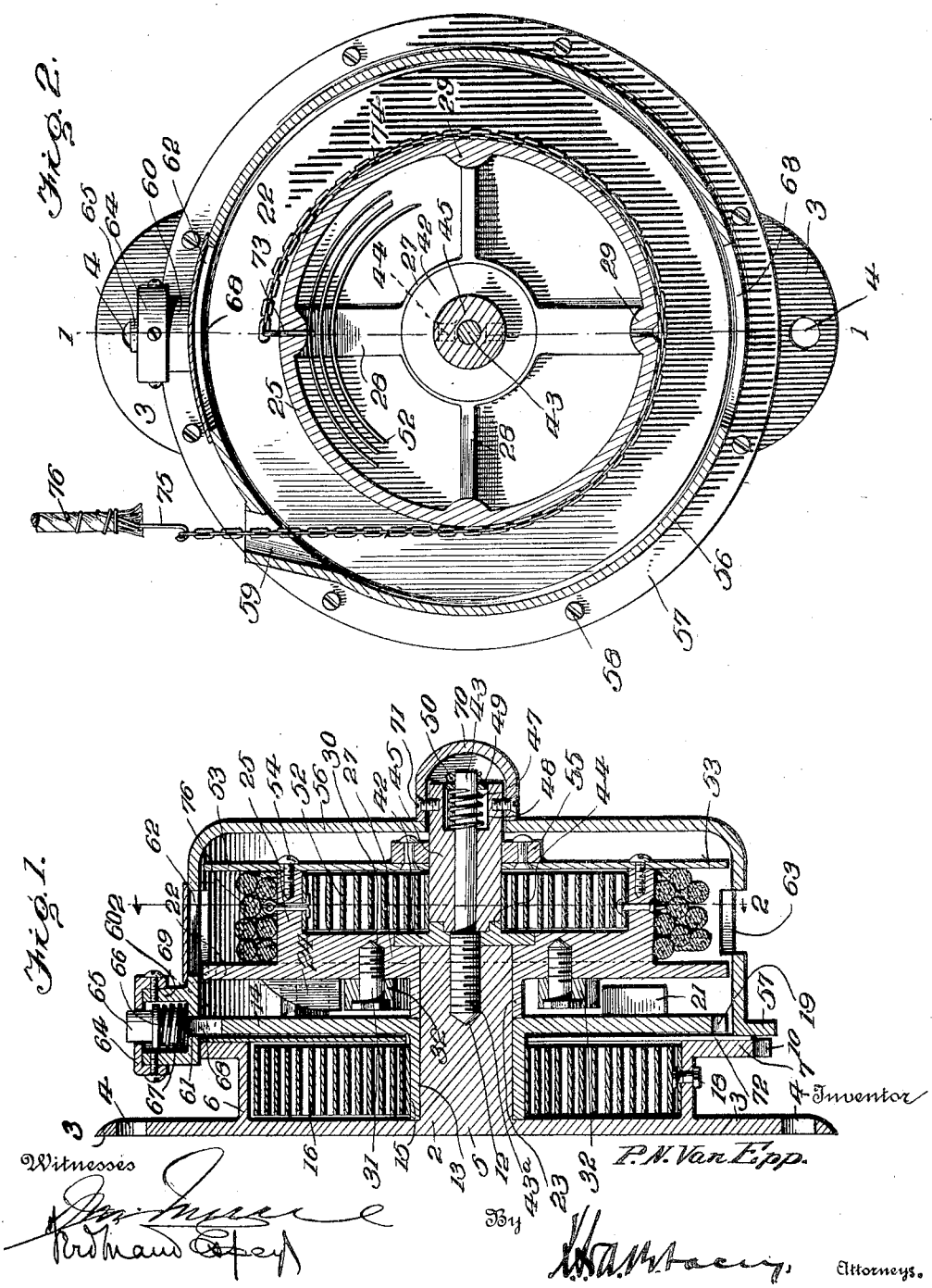

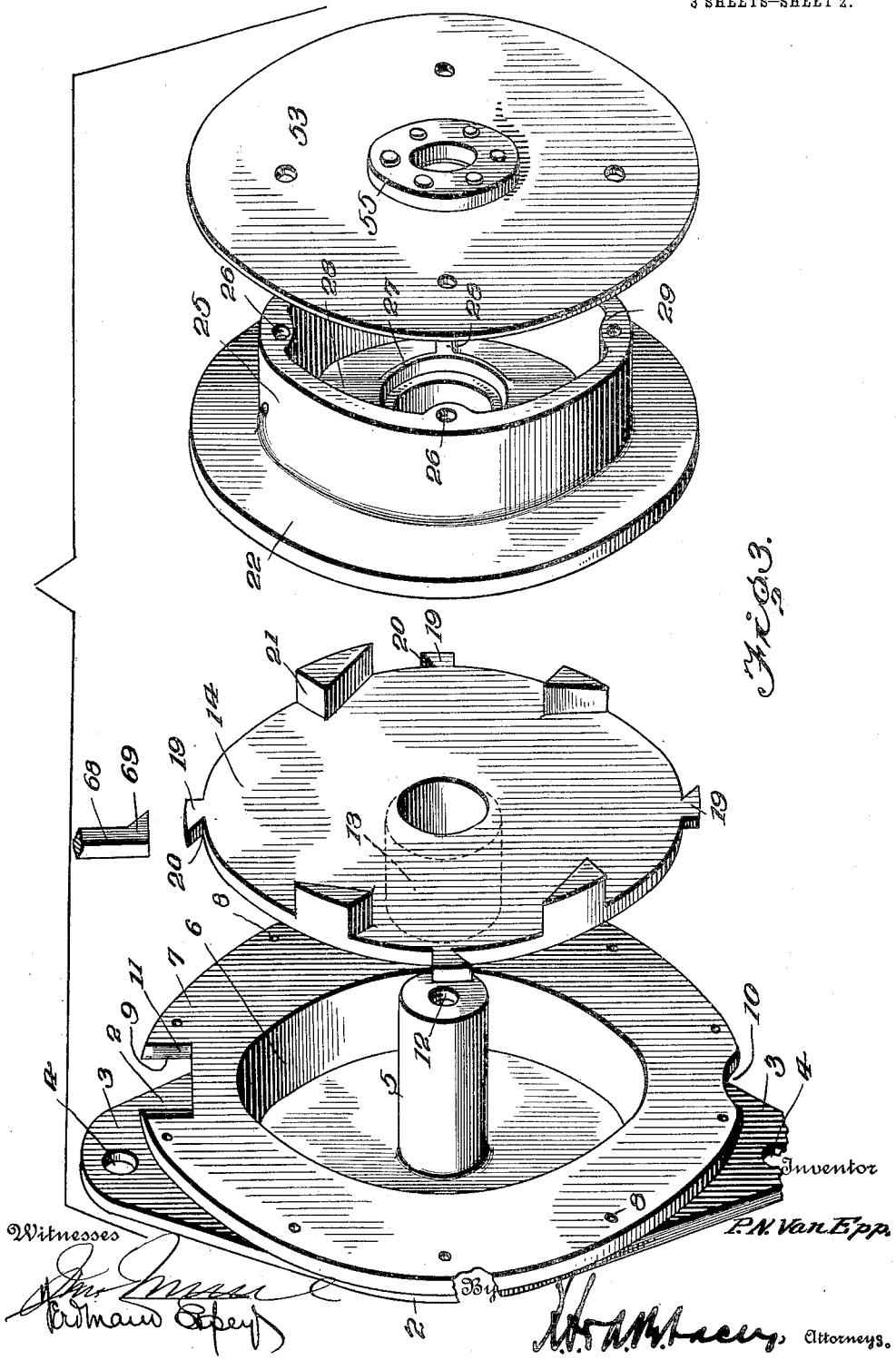

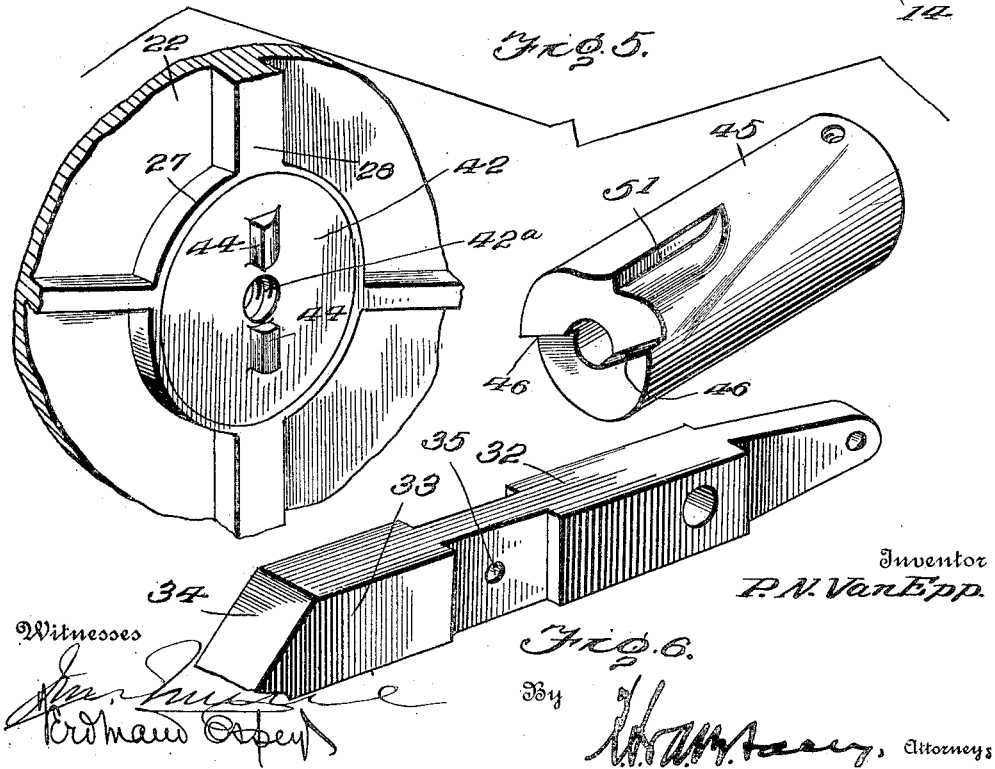

PAUL N. VAN EPP, OF MEDINA, OHIO, ASSIGNOR OF ONE-THIRD TO LAKE E. OWEN, OF CATAWBA ISLAND, OHIO.

TROLLEY-RETRIEVER.

1,107,465.  Specification of Letters Patent.  Patented Aug. 18, 1914.

Application filed January 25, 1913. Serial No. 744,265.

*To all whom it may concern:*

Be it known that I, PAUL N. VAN EPP, citizen of the United States, residing at Medina, in the county of Medina and State of Ohio, have invented certain new and useful Improvements in Trolley-Retrievers, of which the following is a specification.

My invention relates to trolley retrievers such as are used on interurban electric overhead trolley cars for the purpose of preventing injury to the trolley pole and wire should the trolley wheel jump the wire, and particularly to that form of retriever which includes a spring actuated drum connected by a cable to a trolley pole and means for throwing the drum into operation to retract the trolley pole when the latter slips off the trolley wire.

The primary object of my invention is the provision of a practical and proficient retriever of this type of relatively simple construction, easily operated and easily adjusted to the different requirements of operation.

A further object is to provide means in connection with the main drum whereby the slack in the trolley rope may be taken up and the slight rise and fall of the trolley wheel permitted so that the trolley wheel may follow the overhead conductor or wire and accommodate itself to the varying altitude thereof without affecting the trolley lowering mechanism.

A further object in this connection is to provide means whereby the tension of the spring of the auxiliary drum, that is the spring which keeps a constant light tension upon the trolley rope, may be adjusted as desired and whereby the spring may be allowed to run down if necessary.

A further object is to provide means whereby the main spring which actuates to retrieve the trolley when the trolley wheel slips from the wire may be adjusted to said varying conditions and whereby it may be allowed to entirely run down if desired.

Other objects will appear in the course of the following description.

My invention is illustrated in the accompanying drawings in which:

Figure 1 is a vertical section of my improved retriever on the line 1—1 of Fig. 2; Fig. 2 is a vertical section on the line 2—2 of Fig. 1; Fig. 3 is a perspective view showing the base member, the power spring arbor, the rope drum, and the front plate of the rope drum, these parts being separated; Fig. 4 is a rear inner face view of the rope drum showing the governor arms; Fig. 5 is a fragmentary perspective view of the outer face of the rope drum with the latch washer in place, this view also showing the arbor for the rope winding spring; Fig. 6 is a perspective detail view of one of the governor arms; and Fig. 7 is a detail view of the detent for holding the main spring arbor from operation.

My improved retriever as illustrated in the accompanying drawings includes a base plate or back plate 2 which is adapted to be supported in any suitable manner and preferably attached to the rear dash board of a trolley car, the plate being formed with ears 3 having openings 4 for the passage of attaching bolts. Projecting from the center of the plate and formed integral therewith is a hub 5, and arranged concentrically to this hub and projecting in the same direction is an annular wall 6 formed at its inner end with an outwardly turned annular flange 7. This flange is perforated at a plurality of points, as at 8, to provide for the attachment of a housing or casing, as will be later described, and is provided at diametrically opposite points with cut-away portions 9 and 10. The cut-away portions provide for the ready insertion of bolts through the perforations 4, and the recess or cut-away portion 9 is beveled as at 11 for a purpose to be later stated. The hub 5 is counter-bored as at 12, the bore being screw threaded to receive a screw threaded pin, as will be later stated. It will be noted from Fig. 3 that the hub 5 extends out beyond the inner face of the flange 7.

Rotatably mounted upon the hub 5 is an arbor 13 formed integral with a circular disk or plate 14 which extends out beyond the inner face of the wall 6 so as to overlap the flange 7. The circumference of the arbor 13 is formed with the longitudinally extending shoulder 15 for engagement by a spring 16. This spring at one extremity is bent so as to hook over or into this shoulder 15 and at its other extremity is attached to the wall 6 of the casing by means of a bolt 18. It will be understood, of course, that this spring 16 is a volute spring of relatively great tension when wound up. The depth of the arbor 13 is such that the plate 14 is entirely out of contact with the edge of the spring 16 or the face of the flange 7. The circumference of the plate 14 is formed with a plurality of radially extending lugs 19, one end of each lug being reëntrantly angular, as at 20, for a purpose to be later disclosed. The face of the plate 14 is provided at a plurality of points with laterally projecting lugs 21, these lugs being disposed between each pair of the lugs 19. The lugs are triangular in shape so as to present a gently inclined face on one side and an acutely angled face on the other side.

Surrounding the hub 5 is a disk or plate 22 having a centrally disposed sleeve 23 which fits upon and rotates on the hub 5. The sleeve 23 is of such a depth that the inner face of the plate 22 does not come in contact with the outer faces of the lugs 21. The face of the plate 22 which is directed toward the plate 14 is formed at opposite points of its diameter with the stops 24 which project toward the plate 14 and which are arranged inward of the path of movement of the lugs 21 so that the stops will not come in contact with the lugs. The purpose of these stops will be hereinafter stated. The opposite side of the plate is formed with an annular wall 25 forming a rope drum arranged concentrically to the axis of the plate 22, this wall being bored at a plurality of points, as at 26, for the accommodation of attaching the screws. The sleeve 23 is continued beyond the outer face of the plate 22, as at 27, and extending radially from the ring so formed are reinforcing or strengthening ribs 28. Where the bores 26 are formed in the wall 25 the wall is thickened as at 29 so as to strengthen it at these points to accommodate relatively large screws. The opposite face of the plate 22, that is, the face directed toward the plate 14, is formed at opposite points with the screw threaded sockets 30 for the reception of stud bolts 31, and rotatably mounted upon these bolts are the governor arms 32, one of which is illustrated in detail in Fig. 4. It will be seen that these governor arms are unequally pivoted so that the pivot screw 31 is nearer to one end of the arm than the other. The long end of the arm is provided at its termination with a relatively thick head 33 formed with an inclined face 34. Each governor arm intermediate its pivot and the head 33 is perforated at 35 for the attachment of a link 36, which link extends to and is pivoted to the reduced end of the other governor arm. The governor arms are therefore connected by two links 36.

Projecting from the face of the plate 22 is a stud 37 through which passes a screw threaded spring adjusting pin 38 connected at its end to a coil spring 39 whose other extremity is connected to the headed end of one of the governor arms, preferably by means of a swivel connection, in this instance shown as a cotter pin 40. It will be obvious that by rotating the adjusting screw 38, the tension of the spring 39 may be increased or diminished to any desired extent, and it will also be plain that the spring 39 will rotate with the adjusting screw 38 so that the spring will not be subjected to any torsional stress. It will be also noted from Fig. 4 that when the governor arms are thrown outward, as by centrifugal force, and against the force of the spring 39, the back of each governor arm will come in contact with the inner face of the corresponding lug 24 but that under normal circumstances the spring 39 will act to draw the governor arms into full line position, as in Fig. 4, and that one or both of the governor arms will then bear against a stop pin or pins, in this instance shown as a pin 41 having screw threaded engagement with the face of the plate 22.

Disposed within the seat formed by the extension 27 of the sleeve 23 is the thrust washer 42, a detail view of which is shown in Fig. 5. This washer is annular in form and has a screw threaded perforation $42^a$ at its center. It is also provided at diametrically opposite points on each side of the screw threaded perforation with the outwardly projecting ratchet teeth 44. One side of each tooth is straight faced and the other face is inclined.

Extending into the bore 12 and having screw threaded engagement with this bore is a pin 43, the portion which projects beyond the bore 12 being reduced in diameter and smooth. The screw threaded enlarged portion $43^a$ of this pin, it will be seen, engages also with the washer 42 and comes flush with the face of the washer when the parts are assembled. The reduced portion of the pin is relatively long, and surrounding this reduced portion and rotatable thereon is a rope tension spring arbor 45, the inner end of which is formed with oppositely disposed ratchet teeth 46 adapted to coact with the teeth 44 formed upon the washer 42. It will be obvious that when the arbor 45 is rotated in one direction the ratchet teeth thereon will slip past the ratchet teeth 44 but that these ratchet teeth 44 will act to prevent any reverse movement of the arbor. The arbor 45 is held with its teeth in engagement with the teeth 44 by means of a spring 47 which is mounted on the projecting end of the pin 43 and is housed within a recess 48 formed in the outer extremity of the arbor 45. This spring is held in place between the end of the recess and a washer 49 surrounding the extremity of the pin 43 by a cotter pin 50. The side face of the arbor 45 adjacent its inner end is notched as at 51 to receive and engage with the inner end of a coil spring 52 which acts to apply ordinary light tension to the trolley rope. The other end of the spring is attached by means of a bolt, screw or other suitable fastening means to the wall 25. It will be seen that the wall 25 entirely incloses and houses this spring 52 and that the spring is slightly narrower than the depth of the recess inclosed by the wall 25.

Surrounding the arbor 45 and attached to the wall 25 is a circular plate 53 perforated for the passage of screws 54 which enter the bores 26 in the wall 25. This plate is reinforced around its central aperture by means of a reinforcing ring 55 riveted or otherwise attached to the plate. It will be understood, of course, that the arbor 45 is freely rotatable within the ring 55 and that the plate 53 with the ring 55 rotates with the plate 22 and its attached parts.

Mounted upon the flange 7 of the base and housing the rotatable parts heretofore described is a casing 56 having a circular side wall and a front plate perforated at its center so as to be slipped over the arbor 45. The wall of the casing 56 at its edge is formed with an outwardly turned flange 57 perforated for the passage of screws 58 whereby the casing may be rigidly attached to the flange 7. The casing is formed with a rope outlet eyelet or opening 59 whose passage extends tangentially to the wall of the casing, and it is formed at its top with a cylindrical housing 60 having a perforation 61 at its bottom leading into the interior of the casing. This perforation 61 is rectangular in form. The top and bottom of the side wall of the casing is formed with openings 62 and 63.

The casing 60 is covered by a cap 64 perforated at its center for the passage of a push stud 65. This push stud has a central collar 66, which collar contacting with the cap 64 limits the downward movement of the push pin or stud. Disposed within the housing 60 and surrounding the push pin or stud is a coil spring 67 which acts to force the stud outward. The lower portion of the stud is reduced to form a detent 68, this detent being rectangular in section and passing through the opening 61. When the stud 65 is pushed inward against the force of the spring 67, this detent projects into the path of movement of the lugs 19 on the plate 14. When, however, the spring pushes the lug outward, the detent is withdrawn from the path of movement so that the plate 14 may revolve freely. It will be seen from Fig. 6 that this detent has one face inclined, as at 69, and that this beveled or inclined face 69 fits the bevel on the end 20 of any one of the lugs 19. Thus when the beveled face of the detent is in engagement with the beveled face of the lug 19, the lug 19 overhangs the detent and acts to prevent the retraction of the detent by the force of the spring 67, as will hereafter more fully appear.

The projecting end of the arbor 45 is covered by means of a cap 70 attached to the arbor by diametrically-opposed screws 71. It will be obvious that by rotating this cap, which forms practically the head of this arbor, the arbor will be rotated and that if this arbor is rotated in one direction, that is, the direction permitted by the inclined face of the ratchet 44, the spring will be wound up, and that the spring may be relieved of tension by removing the cap 70, withdrawing the cotter pin 50, thus relieving the tension on spring 47 and thus permitting the arbor to be turned in a reverse direction to that originally stated, after which the parts may be put back in their original position. A spacing plate 72 may be disposed between the face or flange 7 and the flange 57 if desired, this plate extending over the inner end of the spring 16 and absolutely preventing any contact between the spring and the plate 14 and entirely housing this spring so as to prevent any chance of the spring springing out of its position if the casing and connected parts are detached. A name plate or like collar plate may be applied over the opening 63 of the casing, or the openings 63 and 62 may be left uncovered.

For the purpose of attaching the rope to the drum, I provide the drum 25 with a cotter pin 73 which extends out through the wall 25 of the drum and to which is connected a chain 74. The trolley rope is provided at one extremity with a hook 75 engageable with the last link of this chain. The trolley rope is designated as 76 and may be of any suitable construction. It will, of course, be understood that the trolley rope is attached opposite its end 75 to the trolley pole in any suitable manner and that this pole is held up against the wire or conductor by means of the usual spring, ordinarily having a tension of twenty-five pounds.

In assembling the retriever, the pin 43 is inserted in the threaded opening in the end of the hub 5 of the base plate. The power spring 16 is then inserted within the housing formed by the wall 6 of the base plate, the outer end of the spring being anchored to the casing by means of the bolt 18 set through the wall 6. The spring arbor plate 14 is then fitted over the hub 5 with the arbor 13 inward and inside of the power spring 16. The inside end of the power spring 16 is then anchored to the arbor 5 by turning over the inner end of the power spring and catching it on the rib 15.

The rope drum formed by the plate 22 and the wall 25 with the governor arms attached, as shown in Fig. 4, is then fitted over the hub 5 with the sleeve 23 of the rope drum resting against the arbor plate 14 and serving as a bearing for the rope drum and a spacer for keeping the governor arms from touching the plate 14. The thrust washer 42 is then slipped over the pin 43 and is threaded upon the outer end of the large end of the pin 43 and the thrust washer is screwed home until it rests flush against the end of the stud 5, and thereby securely holds the plate 22 and rope drum in position upon the hub 5, allowing them to rotate freely, however, and preventing any end play. The rope tension spring 52 is then inserted within the drum 25. Its outer end is then securely anchored to the drum by means of a bolt. The rope tension spring arbor 45 is then fitted over the pin 43 with its ratchet end resting against the ratchet teeth of the thrust washer 42. The spring 47 is then slipped over the projecting end of the pin 43 and disposed in the recess in the end of the arbor 45 and is held in place by the washer 49 and cotter pin 50. The rope tension spring is then anchored to the arbor 45 by having its inner end turned over and caught in the groove provided on the arbor. The front plate 53 is then fitted over the arbor 45 and attached to the rope drum by means of screws 54. The casing is then attached to the back plate. The octagonal cap 70 is then fitted over the end of the arbor 45 and securely attached thereto by means of the screws 71. The spring 67 is inserted in the casing 60, then the push rod or stud 65 is inserted with its lower or detent end 68 extending through the opening to the inside of the casing. The cap 64 is then fitted over the push rod 65 and securely attached in place by means of screws. The name plate may then be attached to the casing and cover the adjusting hole or opening in the casing. The retriever is now assembled.

The trolley rope is provided with a steel hook or eye. The end of this rope is inserted through the rope eyelet opening and the rope forced inward until the end of the rope is extended through the hole 63 in the bottom of the casing 56. The hook end of the trolley rope is then engaged with the chain and then the cap 70 is turned, causing the rotation of the spring arbor 45 and causing the rope tension spring 52 to be wound up on the arbor. By turning the cap 70 the rope drum will be caused to revolve and to wind up the trolley rope upon the rope drum until the cap 70 has wound upon the drum a sufficient quantity of the trolley rope and until a sufficient tension of the spring 52 has been secured. This tension should be about five pounds. In other words, the trolley rope should always be under sufficient tension to be kept taut but free to pay out as the trolley pole rises.

In order to wind up the power spring 16, the following method is to be adopted: After the trolley rope is wound upon the rope drum and under five pounds tension as before described, the trolley rope is to be given a quick upward jerk. This will cause the rope drum to rotate rapidly, and the centrifugal force will cause the governor arms to be thrown outward in such position that they will engage with and catch on the projecting lug 21 of the arbor plate 14. The rope drum will now be locked to the arbor plate by means of the governor arms. A continued pulling up on the trolley rope will cause the rope drum to be rotated, and this will rotate the arbor plate 14 and arbor 13, thus winding up the power spring around the arbor 13. After the rope has been pulled out until the power spring 16 is under proper tension, the push stud 65 is pushed in and the strain on the rope is released. This will cause the power spring 16 to rotate the plate 14 in a reverse direction until one of the projections 19 comes in contact with the detent 68. It will be noted that it is the inclined face 20 of the projection or stud 19 which engages the inclined face of the detent 68. As the arbor plate 14 is under the heavy tension of the power spring 16, the cutaway or inclined face of the projection 19 will be held firmly against the inclined face of the detent 68 and the detent cannot be pushed outward but is held in its pushed-in position against the tension of the spring 67. Neither can this detent 68 be pulled outward by hand, as the top of the stud 65 is just flush or even with the top of the cap 64. The power spring is now wound up and the plate 14 is locked by the detent 68. Upon the release of the rope, the rope drum, under the power of the spring 52, rotates backward in the opposite direction from that of winding up. This causes the governor arms to be drawn away from engagement with the projections 21 and to be returned to their normal positions by means of the tension of the spring 39. The retriever is now wound up and ready for operation. As long as the trolley is on the wire, it will be evident that the retriever will either pay out or wind in the rope as the varying altitude of the trolley requires and that the rope drum 25 is free to rotate in either direction, the ends of the governor arms rotating in a path just inside of the inner edges of the lugs 21 on arbor plate 14.

The trolley pole is normally held up against the wire by a spring having a resilient strength of about twenty-five pounds. Should the trolley wheel jump or leave the wire it will transmit to the trolley rope a quick, violent upward jerk. This will cause the rope drum to rotate rapidly, thereby throwing the governor arms outward by centrifugal force until the ends of the governor arms strike against the projecting lugs 21 of arbor plate 14, thereby locking the rope drum to the arbor plate. The impact or momentum of the governor arms as they strike these lugs throws the arbor plate 14 backward against the tension of power spring 16 for a short distance. This throws the projection 19 which was heretofore in engagement with the detent 68 out of such engagement, and the spring 67 will throw the detent outward and completely out of the path of movement of the projections 19. The tension of the release power spring now overcomes the force of impact on plate 14 by the governor arms, and as the rope drum and the arbor plate 14 are locked together, they will rotate as one under the tension of the power spring 16 in a direction to wind up the trolley rope upon the rope drum 25, thereby pulling the trolley pole down. In order to reset the parts to operate again, the trolley rope is pulled upward with a quick hard jerk. This will cause the governor arms through their engagement with the studs 21 on the arbor plate to wind up spring 16. The withdrawal of the rope is continued until the required tension has been secured. The stud 65 is then pressed inward and held down and the drum is allowed to rewind the rope until the governor arms release. When this occurs, the push button or stud 65 is released and will stay in its retracted position with its top flush with the cap. The retriever will now allow the rope to be pulled out or wind it in, the power spring being to this extent inoperative—as long as the rope is pulled out slowly nothing occurs, but whenever there is a quick jerk, as of a trolley pole leaving the wire, the main spring 16 will be released and the spring will exert a strong enough pull on the rope to draw down the trolley pole.

It will be seen that my retriever is automatic in its action with the main spring 16 normally held out of operation but that it is automatically released by the shock of the governor arms striking the lugs 21, and that when released it will immediately act to draw down the trolley pole. It will also be seen that the tension of the main spring may be adjusted by drawing out the rope slowly after this engagement so as to wind up the main spring and that after it has been wound up to the proper tension, is held by the pressure of the stud or button 65. It will also be noted that the tension of the rope winding spring 52 may be adjusted by rotating the arbor 45 by means of the octagonal cap 70.

It is pointed out that the parts of the device may be readily assembled and disassembled, thus permitting the device to be cheaply manufactured and easily taken apart for repair or renewal, and that as the tension of the springs is adjustable, the retriever is adapted to be applied to any make of car or trolley car having a trolley pole.

Having thus described the invention, what I claim is:

1. In a trolley retriever, the combination with a trolley rope drum, a casing inclosing the drum, a spring continuously acting to rotate the drum in a rope winding direction, and means projecting out of said casing and manually rotatable for adjustably tensioning said spring, of a power spring, an arbor therefor, means manually shiftable into engagement with the arbor and in this position holding the arbor from rotation, means urging said holding means out of its engagement with the arbor, and operative when the arbor moves in a rope unwinding direction, and centrifugally actuated means for operatively connecting the power spring arbor to the drum upon a rapid movement of the drum in an unwinding direction whereby to release said holding means and permit the power spring to rotate the arbor and drum in a rope winding direction.

2. In a trolley retriever, a casing, a stationary hub or spindle disposed within the casing, a drum mounted upon the hub, a spring arbor mounted in alinement with the hub and rotatable around the axial center of the hub and projecting out of the casing for manual rotation, means for holding said spring arbor in any rotatably adjusted position, and a spring surrounding the arbor and connected at one end to the drum and at the other to said arbor.

3. In a trolley retriever, an outer casing, a stationary hub or spindle, a drum mounted thereon, a spring arbor disposed in alinement with the hub and detachably connected thereto, said arbor projecting at one end through the casing and being thereby adapted for manual rotation, the inner end of the said arbor being formed with teeth, the outer end of the hub carrying coacting teeth, said teeth preventing a rotation of the arbor in one direction but permitting of a rotation of the arbor in the other direction, and a spring attached at its outer end to the drum and at its inner end to the spring arbor.

4. In a trolley retriever, an outer casing, a stationary hub, a rope drum mounted thereon, a spring arbor disposed in alinement with the hub and one end of said arbor projecting out through the casing and being formed with a head whereby it may be manually rotated, coacting ratchet devices upon the confronting faces of the hub and arbor preventing a rotation of the arbor in one direction relative to the hub but permitting said rotation in the opposite direction, resilient means forcing the arbor inward toward the hub to hold the ratchet devices in engagement but permitting the arbor to be shifted outward away from the hub, and a spring disposed between the arbor and said drum and engaging the drum and arbor.

5. In a trolley retriever, an outer casing, a stationary hub or spindle, a rope winding drum mounted thereon, a tubular spring arbor disposed in alinement with the hub and projecting at one end through the casing and being thereby adapted for manual rotation, the confronting faces of the hub and arbor having interengaging teeth, a detachable pin passing through the tubular arbor and engaging with the hub and forming a bearing for the arbor, a spring mounted on said pin and forcing the arbor toward the hub, and a coil spring attached at its inner end to the arbor and at its outer end to said drum.

6. In a trolley retriever, the combination with a trolley rope drum, a spring continuously acting to rotate the drum in a rope winding direction, of a power spring, an arbor therefor, means manually shiftable into engagement with the arbor and in this position holding the arbor from rotation in one direction, means urging said holding means out of its engagement with the arbor and operative when the arbor moves in a rope unwinding direction, and centrifugally actuated means for operatively connecting the power spring arbor to the drum upon a rapid movement of the drum in an unwinding direction whereby to release said holding means and permit the power spring to rotate the arbor and drum in a rope winding direction, said means including oppositely disposed arms pivotally mounted upon the trolley rope drum at points diametrically opposite each other, links pivotally connecting the arms to each other for coincident movement upon their pivots, a spring engaging one of said arms and urging said arms into a retracted position, stops limiting the movement of the arms against the action of said spring, and lugs carried by the arbor of the power spring adapted to be engaged by said arms when the latter are thrown out by centrifugal force.

7. In a trolley retriever, a stationary hub or spindle formed with a screw threaded bore, a rope winding drum mounted for rotation on said hub, an interiorly screw threaded washer fitting against the drum and against the end of the hub, a pin having a screw threaded end portion engageable in the bore of the hub and the perforation of the washer, a tubular member mounted upon said pin and held from rotation, and a spring attached at one end to the tubular member, coiled within the drum and attached at its other end to said drum.

8. In a trolley retriever, a central stationary hub or spindle having an axial screw threaded bore, a rope winding drum mounted for rotation on the hub and having a recess in its face larger than the hub, a washer seating in said recess and against the end of the hub and having a central screw threaded perforation, a pin having a screw threaded portion engaging with the washer and the hub and projecting beyond the face of the washer, an arbor having rotative adjustment upon the pin, and a coil spring connected at one end to the arbor and at its other end to the drum and housed within the drum.

9. In a trolley retriever, a central stationary hub having an axial screw threaded bore, a rope winding drum mounted for rotation on the hub, a washer normally bearing against the face of the drum and the end of the hub and having a central screw threaded perforation, said washer being formed on its outer face with ratchet teeth, a pin having one end thereof screw threaded for engagement with the perforation of the washer and the bore of the hub, a spring arbor rotatably mounted upon the pin and having ratchet teeth coacting with the ratchet teeth of the washer, a spring yieldingly holding the arbor in engagement with the ratchet face of the washer, and a coiled spring housed within the drum and connected at one end to the drum and at its inner end to the arbor.

10. In a trolley retriever, a stationary hub formed with an axial screw threaded bore, a rope winding drum mounted thereon, a washer bearing against the face of the drum and the end of the hub, and having a central screw threaded perforation and ratchet teeth upon its face, a pin having a screw threaded end engaging the bore of the hub and the perforation of the washer and projecting beyond the drum, an arbor rotatably mounted upon the pin and having its inner end formed with ratchet teeth coacting with the ratchet teeth on the washer, the end of said arbor being recessed, a coiled spring surrounding the end of the pin and disposed in said recess and acting to force the arbor into engagement with the ratchet teeth on the washer, a washer surrounding the end of the pin and disposed in the end of the recess and detachably holding said spring in place, and a take-up spring housed within the drum and attached at its outer end to the drum and at its inner end to said arbor.

11. In a trolley retriever, a base plate having a central stationary hub and a wall concentric to the hub and formed with an outwardly projecting annular flange, the hub being formed with a screw threaded bore and projecting beyond the plane of the face of said flange, a casing having a marginal flange detachably connected to the flange of the base plate, an arbor rotatable upon the stationary hub and including a disk formed with peripheral radially projecting lugs and having marginal lugs upon its face, a coiled spring mounted on the arbor and connected at its outer end to the annular wall of the base plate, a rope drum having a central sleeve rotatably mounted upon the hub, said sleeve bearing against the disk, a spring arbor rotatably mounted upon the hub and projecting at its end through the casing whereby to permit a manual rotation of the arbor, means for adjustably holding said arbor from rotation in one direction, a coiled spring connected at one end to said arbor and at its other end to the winding drum and housed within the winding drum, centrifugally actuated governor arms mounted upon the inner face of the winding drum and adapted to engage said marginal lugs when thrown out, a detent mounted in the casing and manually movable into position to engage the peripheral lugs on the said disk to prevent a rotation of the disk, and a spring urging said detent out of the path of movement of said lugs.

12. In a trolley retriever, a base plate having a central stationary hub formed with a central screw threaded bore, and a wall concentric to the hub and formed with an outwardly projecting annular flange, a casing connected to said flange, an arbor surrounding the stationary hub and including a disk formed with peripheral radially projecting lugs, the face of the disk also being formed with marginal lugs, a coiled spring surrounding the arbor and connected at one end to the arbor and at the other end to the annular wall of the base plate, a sleeve mounted upon the hub, a rope drum formed integral with the sleeve and comprising a disk having an inwardly directed flange concentric to the axis of the sleeve, said disk projecting beyond the flange, a washer disposed against the inner face of the drum and having ratchet teeth on its face, a pin screw threaded at its inner end and engaging said washer and the screw threaded bore of the hub, said pin projecting beyond the drum, a circular plate detachably connected to the outer face of the rope drum and projecting beyond the flange of the same, an arbor rotatably mounted upon the pin and having ratchet teeth engaging with the ratchet teeth on the face of the washer and a recess in its outer end, a spring connected at one end to said arbor and coiled around the same and connected at its other end to the flange of the drum, a spring surrounding the extremity of the pin and disposed in said recess and forcing the arbor inward and its ratchet teeth in engagement with the ratchet teeth of the washer, means on the end of the pin engaging said spring, a cap disposed on the outer face of the casing and detachably engageable with the arbor whereby the arbor may be turned to tension the spring, a detent mounted at the base of the casing and movable into or out of the path of movement of the peripheral lugs of the disk, said detent and said lugs being coactingly beveled on one face, and a spring urging said detent out of the path of movement of the lugs.

13. A trolley retriever including a base plate having a spindle projecting therefrom, a concentric flange, a rope drum mounted on the spindle, a spring therefor connected at one end to the spindle and at the other end to the rope drum, a rotatable member on the spindle, a spring therefor, centrifugally actuated devices mounted upon said rope drum and adapted to operatively engage the rotatable member upon a rotation of the rope drum in one direction beyond a certain point, an outer casing having a central opening to receive said spindle, a peripheral flange adapted to coact with the flange on the base plate, means for holding the casing to the base plate, a housing formed on the casing, a latch disposed within the housing adapted to engage the rotatable member to hold it from rotation in one direction but permit its rotation in the other direction, and a spring adapted to shift said latch outward upon a rotation of the said rotatable member with the rope drum whereby to permit the reverse rotation of the said member and the rope drum under the power of the main spring.

In testimony whereof I affix my signature in presence of two witnesses.

PAUL N. VAN EPP. [L. S.]

Witnesses:
　Loretta Kavanagh,
　Bessie Wilder.